United States Patent
Young

[15] 3,658,698
[45] Apr. 25, 1972

[54] METHOD FOR RECHARGING AN ION EXCHANGE RESIN

[72] Inventor: David P. Young, South San Francisco, Calif.

[73] Assignee: Technicraft International, Inc., San Matio, Calif.

[22] Filed: Mar. 16, 1970

[21] Appl. No.: 20,135

[52] U.S. Cl.................................................210/32, 210/37
[51] Int. Cl.......................................................B01d 15/06
[58] Field of Search..............................210/32, 37; 260/519

[56] References Cited

UNITED STATES PATENTS 3,471,553  10/1969  Bittner...................................260/519

Primary Examiner—Reuben Friedman
Assistant Examiner—Thomas G. Wyse
Attorney—Flehr, Hohbach, Test, Albritton and Herbert

[57] ABSTRACT

A method for recharging and purifying an acetate group ion exchange resin which has been used to isolate thyroxine from blood serum. The method includes treatment with an aqueous concentrated acetic acid solution optionally followed by treatment with an aqueous metallic acetate solution.

4 Claims, No Drawings

METHOD FOR RECHARGING AN ION EXCHANGE RESIN

BACKGROUND OF THE INVENTION

Thyroxine, an organic iodide, is the principal active hormone component secreted by the thyroid gland. It is circulated by blood serum through the body. A quantitive determination of thyroxine, based on its iodine content, may be accomplished by isolation from serum contaminants (i.e., all iodine-containing organic and inorganic substances other then thyroxine) followed by analysis of the iodine content of the thus-isolated thyroxine. Presently, such isolation is being performed extensively in the laboratory by chromatography on ion exchange resin columns (commonly designated T-4 by columns) by sequential elution with varying concentrations of acetic acid. The inorganic iodide contaminants of serum are firmly retained on the column at any acid concentration. The organic contaminants are first eluted with a relatively dilute acid wash and discarded. Finally, thyroxine is eluted with a more concentrated acid wash.

The aforementioned method for isolation and quantitation of thyroxine is described as an automated integral procedure in Bittner, D., et al., "An Automated Method for the Bromination and Quantitation of Thyroxine in Resin Column Eluates," published for the Thyroxine Round Table, 1968 Annual Meeting, American Society of Clinical Pathologists (Oct. 14, 1968 at Miami, Florida). According to the Bittner technique, isolation is performed using a resin of the trademark type AG-1,X, 100-150 mesh resin produced by BioRad Laboratories, Richmond, California. This strongly basic anion exchange resin is composed of quaternary ammonium exchange groups attached to a styrenedivinylbenzene polymer lattice. Although the AG-1 resin is originally produced in the chloride form, it is converted to the acetate form for purposes of thyroxine separation. The isolation technique described in the Bittner article is performed on this AG-1 resin in acetate form and includes the following general steps: diluting serum with alkaline medium to dissociate thyroxine from serum protein; depositing the diluted serum into a column of the aforementioned resin; and washing the column with a series of acetic acid solutions of varying pH values. In the first washes, protein, monoiodotyrosine, diiodotyrosine, and some organic contaminants are removed while thyroxine, thyronine, and inorganic iodine remain on the resin. In a second dilution, at a higher concentration of acetic acid, the thyroxine is eluted and quantitated. Although Bittner, et al. described an automated method, thyroxine isolation and quantitation frequently is performed manually. Isolation on the T-4 by column is fast, efficient and accurate.

One drawback of using such columns is that presently there is no available method for reusing the columns after one complete T-4 elution cycle. In fact, all commercial manufacturers of the column specifically instruct purchasers not to reuse the column. One explanation given for this instruction is quite simple; there is a good chance that organic iodide contaminants which were not eluted in the isolation of the first serum sample could be eluted during isolation of the second thyroxine sample. As already noted, these contaminants (or any iodine-containing substance) would interfere with thyroxine quantitation which is based on the iodide content of the column eluate. Another explanation is that such organic iodide contaminants deplete the resin acetate ion groups available for ion exchange during elution of the second sample.

SUMMARY OF THE INVENTION AND OBJECTS

This invention relates to a method for recharging and purifying an acetate ion-exchange resin partially depleted and contaminated by the presence of organic iodide retained thereon.

According to the invention, contaminated resin particles (e.g., following a thyroxine isolation therewith, as described hereinafter, are subjected to treatment with highly concentrated acetic acid for the purpose of recharging and purifying the resin for repeated use. This treatment requires immersion of the resin particles in an aqueous acetic acid solution at an acid concentration substantially greater than 50% and preferably greater than 70%. If the resin is particularly contaminated, the thus-treated resin particles may be drained and retreated with a metallic acetate solution at a molar concentration of at least 0.5 M in sufficient quantity for essentially complete resin immersion. Both treatments are performed to disengage the organic iodide contaminants ionically held by the resin followed by elution thereof and to recharge the thus-vacated ionic groups of the resin with acetate ions.

It is an object of the present invention to provide a rapid and economical method for recharging and purifying an acetate group ion exchange resin which has been partially depleted and contaminated by the presence of organic iodide.

In particular, it is an object of the present invention to provide a method of the above type which enables a used T-4 by column to be employed in the isolation of thyroxine from a subsequent serum sample.

Additional objects and features of the invention will appear from the following description.

DETAILED DESCRIPTION OF THE PREFERRED EMBODIMENT

In the present invention a particulate acetate ion exchange resin which has been used in a T-4 by column for the isolation of thyroxine from protein is recharged for repeated thyroxine isolation therewith. In a primary recharge treatment the resin is immersed in a solution containing a high concentration of acetate ions. For this purpose, the treating solution is preferably aqueous acetic acid at a concentration substantially greater than 50% by volume, more particularly greater than 70%. After such primary treatment the resin may be drained and treated with a secondary acetate ion from a source such as a metallic acetate solution with a molar concentration of at least 0.5 M.

The method of the present invention will be described in terms of recharging an acetate ion exchange resin of the aforementioned AG-1 type. However, it is to be understood that any ion-exchange resin which is in acetate form may be employed. For example variation of polymer lattice attached grouping thereon, and resin mesh size are deemed to be within the scope of this invention.

The primary recharge solution, acetic acid, may vary in concentration from an aqueous solution of 50% acid up to 100% acid (glacial acetic acid). The concentrations of the acid treatment is usually somewhat higher than the concentration of the recharge solution because after being submerged in liquid for prior isolation the resin particles are normally incompletely drained under the force of gravity. Thus the recharge solution is diluted by the liquid retained in the resin yielding a somewhat lower overall acid concentration for treatment. For example, if glacial acetic acid were added to the resin in a ratio of one part by volume acid to one part by volume of retained distilled water, the treating acid, as used herein, would be at 50% concentration.

The function of the optional secondary treatment with a metallic acetate salt is to provide an additional source of acetate ion as a safeguard, if necessary, to assure that the resin is purified and recharged. Although this safeguard normally is not required, it would be most useful where the blood serum is known to contain a high degree of contamination. Any highly ionized metallic acetate aqueous solution may be used such as a solution containing the acetate salts of sodium, potassium, calcium, magnesium, zinc or combinations thereof. For optimum effectiveness, the secondary treating solution should have a concentration of at least 0.5 M solutions containing as high as 4.0 M sodium acetate are particularly effective.

The acetate resin to be recharged must be in contact with the recharge solution for a sufficient period of time for the acetate ions of the recharge solution to replace contaminants in the resin. It has been found that the time for elution under the force of gravity, on the order of 30 seconds, is sufficient contact time. However, it is preferred to place the resin in a recharge solution for a substantial period of time (e.g., 12 hours) to make certain that all the contaminants replaceable by the acetate ions are driven off the resin and withdrawn with the washing effluent for discard prior to performance of the second run.

The amount of recharge solution to be used depends upon the acetate ion concentration thereof. Although an amount on the order of 3.5 ml of concentrated acetic acid would normally contain sufficient acetate ion to recharge and purify the resin, it is preferred to employ at least 7 ml of concentrated acetic acid for recharging, especially if the prior thyroxine isolation were performed on an abnormal blood sample as defined hereinafter.

In order to more clearly disclose the nature of the present invention, a specific detailed description of a first separation by means of a T-4 by column is herein given. It should be understood, however, that this is done by way of example and that modifications of procedure and of the T-4 column itself may be employed in the isolation procedure prior to performance of the present invention.

In one embodiment, thyroxine is separated on a T-4 by column formed of a cylindrical resin with an internal diameter of 8.0 mm and a height of 2.5 cm. An anion-exchange resin formed of AG-1, X2, 100-150 mesh, with at least 90% of the quaternary ammonia groups converted to the acetate form. The total amount of added resin is on the order of 1-1.5 grams.

The exchange resin is first made alkaline by washing with sodium hydroxide reagent (e.g., formed by dissolving 8 grams of sodium hydroxide in 2 liters of water). Blood serum (0.5 ml) is diluted with approximately 6 ml of sodium hydroxide reagent of the same type and quantitatively passed through the aforementioned ion exchange column. Prior studies have demonstrated that essentially all of the serum thyroxine is effectively isolated on the column at this time.

The column is then washed with 2 aliquots (approximately 7 ml each) of acetate alcohol wash solution. This solution may be prepared by dissolving 35 grams of sodium acetate in 1,500 ml of water, and adding 400 ml of methyl alcohol, adjusting the pH to 5.5 with concentrated acetic acid, and adding water to the 2 liter volumetric mark. All effluents of this wash solution are discarded. In a second washing stage, the column is washed with 2 aliquots (about 7 ml each) of 15% acetic acid. All effluents discarded.

During the aforementioned first and second washing stages, proteins, monoiodotyrosine, diiodotyrosine and certain other organic contaminants are removed while thyroxine, traces of thyronine, and inorganic iodides remain on the resin.

The column is then primed for thyroxine solution by the addition of 0.6 ml of concentrated acetic acid thereto. During this step, the remaining traces of thyronine and other contaminants are essentially eliminated in the effluent while the thyroxine is moved from the top to the bottom portion of the resin without elution therefrom. This effluent is discarded and the column allowed to drain as completely as possible under the force of gravity. Even thyroxine, the strongest held of the commonly occurring iodide compounds in blood serum, is moved downwardly under the action of this higher acetate concentration.

To elute the thyroxine, about 3 ml of 50% acetic acid is added twice to the column to form a first and second effluent. The only source of iodine in these effluents should be thyroxine. An iodine analysis may then be performed on each eluent to determine the original thyroxine concentration. It is noted that errors in this determination would be introduced by the presence of any other iodine-containing compound. One such analytical technique for quantitation of thyroxine may utilize the automated method described in the aforementioned Bittner et al. publication.

Inorganic iodide is very strongly held by the anionic exchange resin and is not eluted by the above described isolation method. Therefore, such iodide does not interfere with quantitation of thyroxine. However, it is reasonable to assume that certain organic iodide contaminants in blood serum are also retained on the column and not eluted during the above-described elution process. If it were attempted to use the by column for a second thyroxine quantitation, such retained organic iodides could be eluted along with the thyroxine to produce substantial error in quantitation. This is particularly true with so-called abnormal blood samples, containing greater than 20 microgram percent (i.e., micrograms per 100 ml of whole blood). In fact, it has been found that a first isolation of an abnormal blood sample does leave contaminants on the column which produce errors when a second blood sample were run through the column for purposes of thyroxine quantitation.

According to the invention, the above column which is considered by the T-4 by column industry to be contaminated and of no use, may be recharged for use on the order of 3 to 7 times depending on the effectiveness of the recharge solution.

In one method of the invention, a column, contaminated as above, is filled with distilled water and allowed to drain completely. This step is performed to wash out any water soluble impurities that might be retained on the sides of the column or in the resin after thyroxine isolation of the prior sample.

During the recharging step, the column may be washed with a recharge solution of approximately 7 ml of concentrated acetic acid. To assure complete mixing, the resin and recharge solution should be agitated as by stirring. Following agitation, the recharge solution is retained on the column for a period of time such as 10 minutes. Then, the solution is drained and discarded to complete the recharge. Thereafter, the column may be used for quantitation of a second blood serum sample for thyroxine.

In order to determine the effectiveness of the recharge method of the present invention, 20 different normal and abnormal serum specimens were utilized. Each specimen was diluted with a solution of low-ionic content containing a trace of I-131 labeled thyroxine for elution control and divided into three equal portions (0.5 ml of serum per tube) labeled samples "A," "B," and "C." Then thyroxine from the "A" samples was isolated, each on a separate T4 column and quantitated in a manner as described above. Each of the used "A" columns were then recharged and purified as above described. The "B" samples specimens were then isolated on the corresponding recharged columns and quantitation of the thyroxine therein was quantitated. To provide an independent comparison, the thyroxine in the "C" samples was then isolated on a new column and quantitated. The quantitative values obtained for each of the A, B, and C samples are tabulated in the table below. The numerical values listed represent microgram percent of thyroxine.

| Specimens | Sample A Microgram % | Sample B Microgram % | Sample C Microgram % |
|---|---|---|---|
| Normal specimens | 3.7 | 3.5 | 3.8 |
| | 6.5 | 6.7 | 6.5 |
| | 7.4 | 7.2 | 7.0 |
| | 5.6 | 5.8 | 5.5 |
| | 5.9 | 6.1 | 6.1 |
| | 6.0 | 6.2 | 5.9 |
| Abnormal specimens (low thyroxine value) | 1.3 | 1.2 | 1.2 |
| | 2.0 | 1.8 | 2.0 |
| | 2.4 | 2.5 | 2.7 |
| | 1.6 | 1.7 | 1.5 |
| | 1.9 | 2.0 | 2.0 |
| | 2.1 | 2.0 | 2.4 |
| | 1.0 | 1.1 | 0.9 |
| Abnormal specimens (high thyroxine value) | 9.8 | 10.0 | 10.1 |
| | 8.5 | 8.9 | 8.7 |
| | 10.5 | 10.3 | 10.5 |
| | 11.5 | 11.4 | 11.7 |
| | 12.0 | 12.3 | 12.1 |
| | 13.9 | 14.1 | 13.9 |

| 14.0 | 14.5 | 14.4 |

It can be seen from the above table that the thyroxine values were substantially the same upon quantitation for each of the samples A, B, and C. Thus, the recharge column, used for sample B, performs with essentially the same degree of efficiency as does a fresh column. Consequently by use of the recharge technique of the present invention, one may reuse a column without contamination from a prior isolation on the same column.

It is apparent from the foregoing that a method has been provided for recharging a used T–4 by column. It is obviously more economical to utilize the inexpensive recharge solution to obtain two or more thyroxine isolations on a single T–4 column than to discard the relatively expensive column after one use.

I claim:

1. A method for the sequential isolation of thyroxine from at least two blood serum samples by selective adsorption on a single column of an acetate group anion exchange resin comprising the sequential steps of:
   a. isolating thyroxine from a first serum sample on a column of the anion exchange resin;
   b. eluting a first thyroxine fraction from said column with a volume of acetic acid;
   c. eluting a second fraction of thyroxine from said column with a sufficient second volume of acetic acid so that small quantities of iodine source contaminants remain on said resin;
   d. treating said column with a sufficient quantity of acetic acid recharge solution to obtain essentially complete resin immersion, said recharge solution having an acetic acid content substantially greater than 50% by volume;
   e. maintaining contact between said resin column and said recharge solution for a sufficient period of time for the acetate ions of the recharge solution to replace contaminants in the resin;
   f. draining said recharge solution from said column;
   g. isolating thyroxine from a second serum sample on the same column of anion exchange resin;
   h. eluting thyroxine from said column.

2. A method as in claim 1 wherein said acetate groups are ionically bonded to quaternary ammonia groups forming a portion of said resin.

3. A method as in claim 1 in which the acid concentration of solution added in step (d) is at least 70% by volume.

4. A method as in claim 1 including the additional steps of retreating said drained resin particles from step (f) with an aqueous mixture containing a metallic acetate solution at a molar concentration of at least 0.5 M in sufficient quantity for essentially complete resin immersion, and draining said aqueous mixture from said column.

* * * * *